United States Patent
Gagnon et al.

(10) Patent No.: US 6,668,857 B2
(45) Date of Patent: Dec. 30, 2003

(54) FLOW REVERSAL CONTROL VALVE

(75) Inventors: Frederic Gagnon, Chatham (CA); David W. Balsdon, Chatham (CA)

(73) Assignee: Siemens Canada Limited (CA)

( * ) Notice: Subject to any disclaimer, the term of this patent is extended or adjusted under 35 U.S.C. 154(b) by 0 days.

(21) Appl. No.: 09/888,580

(22) Filed: Jun. 26, 2001

(65) Prior Publication Data

US 2002/0017323 A1 Feb. 14, 2002

Related U.S. Application Data

(60) Provisional application No. 60/214,279, filed on Jun. 27, 2000, and provisional application No. 60/214,864, filed on Jun. 28, 2000.

(51) Int. Cl.[7] .............................................. F16K 15/04
(52) U.S. Cl. .................. 137/539; 137/329.01; 137/271
(58) Field of Search ....................... 137/516.29, 516.27, 137/539, 539.5, 329.01, 329.02, 329.03, 329.06, 269, 271

(56) References Cited

U.S. PATENT DOCUMENTS

| | | | | |
|---|---|---|---|---|
| 1,220,872 A | * | 3/1917 | Meyer ....................... 137/539 |
| 1,488,799 A | * | 4/1924 | Smith ......................... 137/539 |
| 2,761,468 A | * | 9/1956 | Thatcher ..................... 137/539 |
| 2,929,399 A | * | 3/1960 | Magowan .................... 137/539 |
| 3,091,254 A | * | 5/1963 | Kilayko ................. 137/516.29 |
| 3,720,220 A | | 3/1973 | McMath |
| 3,734,115 A | | 5/1973 | McMath |
| 3,768,509 A | | 10/1973 | Goda |
| 4,204,560 A | | 5/1980 | Eriksen ....................... 137/508 |
| 4,286,622 A | * | 9/1981 | Ninomiya et al. ...... 137/516.29 |
| 4,287,912 A | | 9/1981 | Hewett ................... 137/516.27 |
| 4,365,648 A | | 12/1982 | Grothe ....................... 137/539 |
| 4,396,035 A | | 8/1983 | Maples ....................... 137/539 |
| 5,065,790 A | * | 11/1991 | Kornas ....................... 137/539 |
| 5,107,890 A | | 4/1992 | Gute ........................... 137/539 |
| 5,404,904 A | | 4/1995 | Glaser ........................ 137/539 |
| 5,573,033 A | | 11/1996 | Litzel ...................... 137/512.3 |
| 5,575,767 A | | 11/1996 | Stevens ....................... 604/53 |
| 5,582,204 A | | 12/1996 | Hiranuma et al. ......... 137/539 |

* cited by examiner

*Primary Examiner*—John Rivell

(57) ABSTRACT

A flow reversal control valve for use in a fuel cell. The valve includes a housing having a first end and a second end disposed along a longitudinal axis. The valve also includes a wall that defines a first passage in fluid communication with a second passage. The first passage is disposed proximate to the first end and the second passage is disposed proximate to the second end. The valve further includes a chamber in fluid communication with the first and second passages. There are flow flutes formed in the chamber. A seal is disposed in the chamber and coupled to at least one of the first and second passages. The seal has an elastomeric member disposed on a planar surface transverse to the longitudinal axis. There is a closure member disposed in at least one of the first passage, second passage and the chamber. A resilient member acting on the closure member can operate to prevent fluid communication between the first and second passages in a first position where the closure member abuts the elastomeric member when the pressure of the fluid of one of the first and second passages is generally equal to a fluid pressure of the other one of the first and second passages. The resilient member and the closure member can also operate in a second position to permit fluid flow between the first and second passages when the fluid pressure of one of the first and second passages is not equal to the fluid pressure of the other of the first and second passages. The flutes maintain a laminar flow between the first and second passages and guide the closure member towards the seal when the closure member is in the second position.

18 Claims, 2 Drawing Sheets

FLOW REVERSAL CONTROL VALVE

RELATED APPLICATIONS

The present application is related to and claims priority from Provisional Patent Application entitled "Flow Reversal Control Valve," Ser. No. 60/214,279, filed Jun. 27, 2000, and Provisional Patent Application entitled "Flow Reversal Control Valve", Ser. No. 60/214,864, filed Jun. 28, 2000 which are incorporated by reference in their entirety into the present application herewith.

BACKGROUND OF THE INVENTION

It is believed that fluid flow can be controlled to flow in one direction by a one-way check valve.

It is believed that known one-way check valves are not adjustable to permit fluid flow when a change in pressure differential permitting flow across an inlet and outlet is desired.

It is believed that known one-way check valves are not suitable for use in a hydrogen-rich environment of a fuel cell or a hydrogen reformer.

SUMMARY OF THE INVENTION

The present invention provides a flow reversal control valve that can be adjusted according to desired flow rates or pressure differentials. In a preferred embodiment, the valve includes a housing having a first end and a second end disposed along a longitudinal axis. The valve also includes a wall that defines a first passage in fluid communication with a second passage. The first passage is disposed proximate to the first end, and the second passage is disposed proximate to the second end. The valve further includes a chamber in fluid communication with the first and second passages. There are flow flutes formed along the longitudinal axis in the chamber. A seal is disposed in the chamber and coupled to at least one of the first and second passages. The seal has an elastomeric member disposed on a planar surface transverse to the longitudinal axis. A closure member is disposed in at least one of the first passage, second passage and the chamber. A resilient member acting on the closure member can operate to prevent fluid communication between the first and second passages in a first position where the closure member abuts the elastomeric member when the pressure of the fluid of one of the first and second passages is generally equal to a fluid pressure of the other one of the first and second passages. The resilient member and the closure member can also operate in a second position to permit fluid flow between the first and second passages when the fluid pressure of one of the first and second passages is not equal to the fluid pressure of the other of the first and second passages. The surface of the flutes can be configured to maintain a laminar flow between the first and second passages when the closure member is in the second position.

In another preferred embodiment, there is also provided a flow reversal control valve for use in a fuel cell. The valve includes a housing having a first end and a second end disposed along a longitudinal axis. The valve also includes a wall that defines a first passage in fluid communication with a second passage. The first passage is disposed proximate to the first end and the second passage is disposed proximate to the second end. The valve further includes a chamber coupled to one of the first and second passages. There are flow flutes formed along the longitudinal axis in the chamber. A seal disposed in the chamber and coupled to the at least one of the first and second passages. The seal has at least one of a plurality of seat diameters. A closure member is disposed in at least one of the first passage, second passage and the chamber. An elastic member can be located contiguous to the closure member, such that the closure member can operate to prevent fluid communication between the first and second passages in a first position where the closure member abuts the seat face when the pressure of the fluid of one of the first and second passages is generally equal to a fluid pressure of the other one of the first and second passages. The closure member can also operable in a second position to permit fluid flow between the first and second passages when the fluid pressure of one of the first and second passages is not equal to the fluid pressure of the other of the first and second passages. The flutes can center the closure member on the seat face between the first and second passages when the closure member is in the second position.

BRIEF DESCRIPTIONS OF THE DRAWINGS

The accompanying drawings, which are incorporated herein and constitutes part of this specification, illustrate embodiments of the invention, and, together with the general description given above and the detailed description given below, serve to explain the features of the invention.

Figure 1:
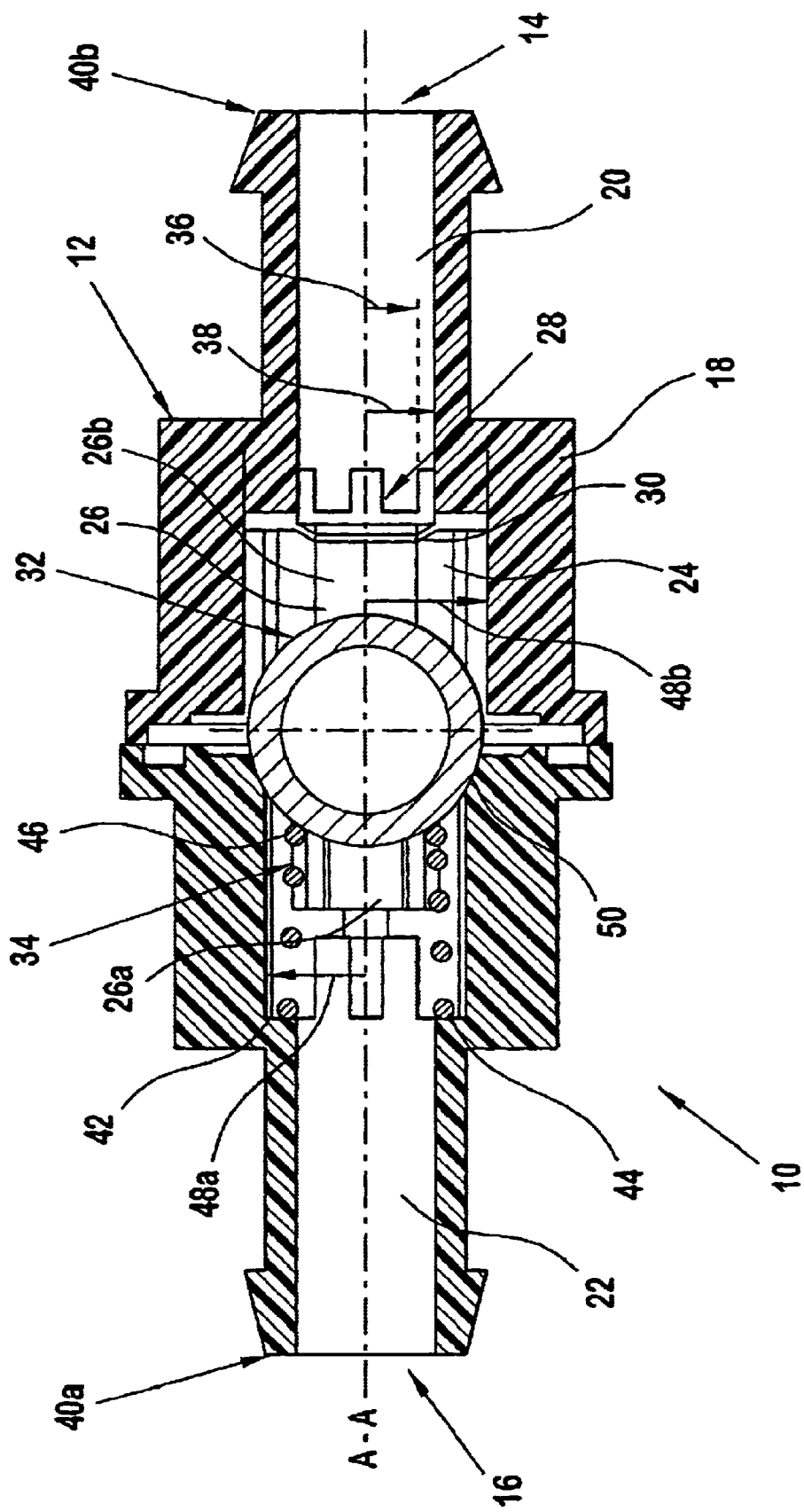
FIG. 1 illustrates a cross-sectional view of a preferred embodiment of flow reversal control valve.

As shown in FIG. 1, the flow reversal control valve 10 includes a housing 12 having a first end 14 and a second end 16 disposed along a longitudinal axis A—A. The valve also includes a wall 18 that defines a first passage 20 in fluid communication with a second passage 22. The first passage 20 is disposed proximate to the first end 14 and the second passage 22 is disposed proximate to the second end 16. The valve 10 further includes a chamber 26 in fluid communication with the first and second passages 20, 22. There are flow flutes 24 defined by ribs which extend radially into the chamber 26. The flutes 24 can be linear or helical flutes orientated along the longitudinal axis A—A. Preferably, there are four flutes 24, defined by four ribs, linearly orientated along the longitudinal axis A—A (2 flutes 24 and 2 ribs are shown in FIG. 1). A seal 28 is disposed in the chamber 26 and coupled to at least one of the first and second passages 20, 22. The seal has an elastomeric member 30 disposed on a planar surface transverse to the longitudinal axis A—A.

There is a closure member 32 disposed in at least one of the first passage 20, second passage 22, and the chamber 26. A resilient member 34 acting on the closure member 32 can operate to prevent fluid communication between the first and second passages 20, 22 in a first position where the closure member 32 abuts the elastomeric member 30 when the pressure of the fluid of one of the first and second passages 20, 22 is generally equal to a fluid pressure of the other one of the first and second passages 20, 22. The resilient member 34 and the closure member 32 can also operate in a second position to permit fluid flow between the first and second passages 20, 22 when the fluid pressure of one of the first and second passages 20, 22 is not equal to the fluid pressure of the other of the first and second passages 20, 22. The flutes 24 are believed to cause a fluid to maintain a laminar flow between the first and second passages 20,22 when the closure member 32 is in the second position. Additionally, it is further believed that the flutes 24 center the closure member 32 on the seat face 50 between the first and second passages 20, 22 when the closure member 32 is in the second position.

Figure 2:
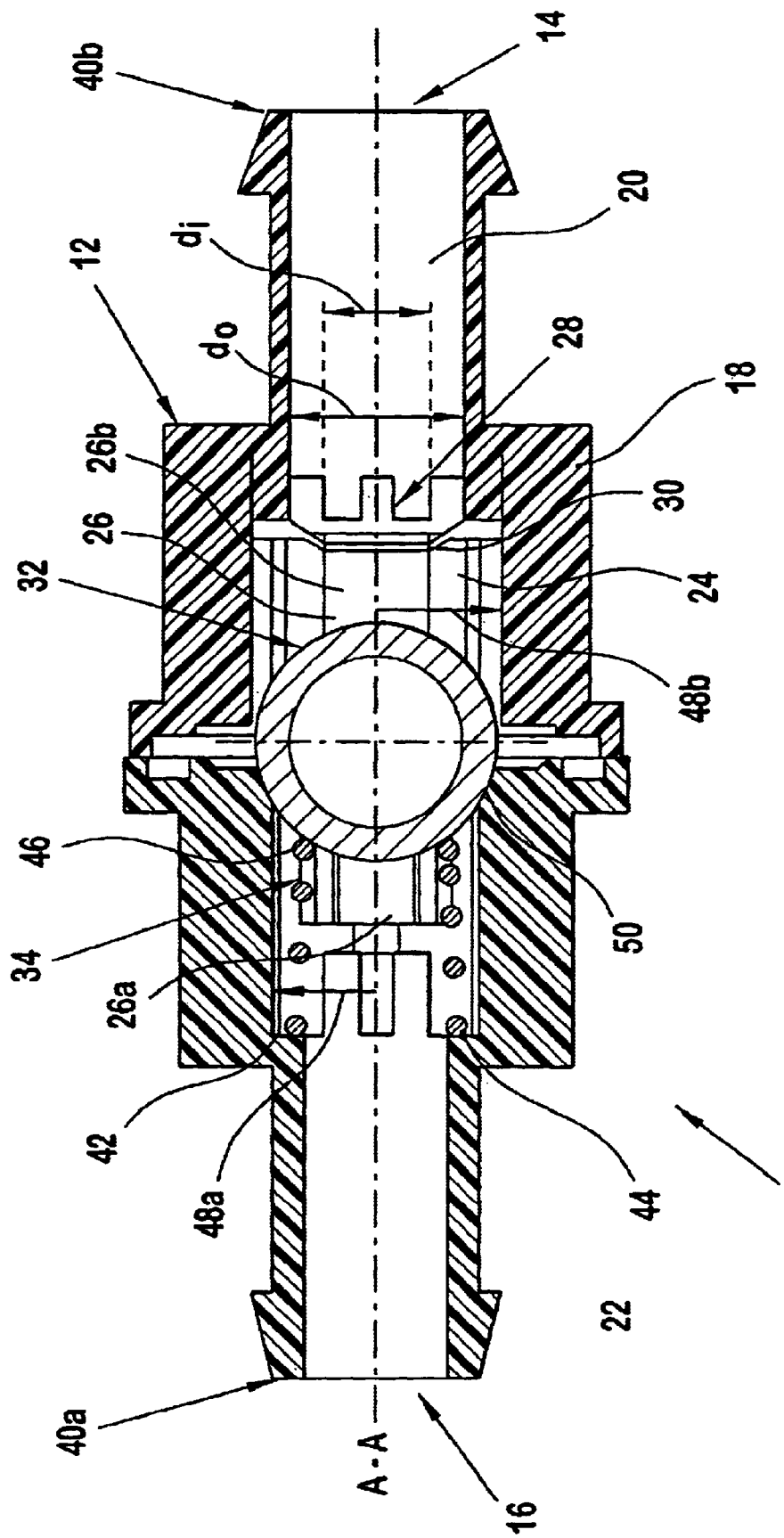
FIG. 2 illustrates a cross-sectional view of another preferred embodiment of a flow reversal control valve.

The seal 28 can encompass at least one of a first seal and a second seal, where the first seal has an inner diameter, shown in FIG. 1 as a radius 36 and an outer diameter, shown in FIG. 1 as radius 38, and the second seal has a different inner diameter, shown in FIG. 2 as $d_i$, and/or different outer diameter, shown in FIG. 2 as $d_o$, relative to the respective diameters of the first seal. Additionally, the elastomeric member 30 can be an annular elastomeric member that has an inner diameter that is generally the same as an inner diameter of the seal 28 and an outer diameter generally the same as an outer diameter of the seal 28. The inner diameter of the second seal can be either smaller or greater than the inner diameter 36 of the first seal, such that the second seal can be substituted for the first seal to adjust the fluid flow or the pressure differential between the first passage 20 and second passage 22.

The first and second passages 20, 22 of the flow reversal control valve 10 can be coupled to, or between, other flow passages by any known techniques for maintaining a fluid connection, for example, welding, brazing, coupling, fitting, or quick-couplers. Preferably, the valve 10 can be coupled, again by any known techniques for maintaining a fluid connection, to other flow passages by serrated nozzles 40a, 40b disposed at distal ends along the longitudinal axis A—A. The resilient member 34 can be a coil spring having a first end 42 abutting a boss portion 44 of the chamber and a second end 46 abutting the closure member 32. The chamber 26 can include a first chamber 26a having a first inner diameter 48a and a second chamber 26b having a second inner diameter 48b greater than the first inner diameter 48a. The ribs, which form the flutes 24 within the first and second chambers 26a, 26b extend radially inward toward the longitudinal axis A—A from the first and second inner diameters 48a, 48b, respectively. The first chamber 26a and second chamber 26b can be integrally formed as a single unit. Preferably, the first chamber 26a and second chamber 26b are formed separately and then coupled together, such as, for example, by bonding, welding or by mechanically coupling the first and second chambers together.

The wall 18 and the closure member 32 of the flow control valve 10 can be made from metals, polymer, powered metals. Preferably, the wall 18 and the closure member 32 are made of a polymeric material. The resilient member 34 can be made from metal or plastic. Preferably, the resilient member 34 can be made from stainless steel to avoid corrosion in a fuel cell environment. The inlet and outlet nozzles 40a, 40b can be made from chemically inert materials such as plastic.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A flow reversal control valve for use in a fuel cell, the valve comprising
   a housing having a first end and a second end disposed along a longitudinal axis;
   a wall defining a first passage in fluid communication with a second passage, the first passage disposed proximate the first end, the second passage disposed proximate the second end;
   a chamber in fluid communication with the first and second passages, the chamber having flow flutes formed along the longitudinal axis in the chamber;
   a seal disposed in the chamber and coupled to the at least one of the first and second passages, the seal having an elastomeric member disposed on a planar surface transverse to the longitudinal axis, the seal including a first seal and a second seal, the second seal being substitutable in place of the first seal to adjust fluid flow between the first and second ends, the first seal having an inner diameter and an outer diameter, the second seal having an inner diameter and an outer diameter;
   a closure member disposed in at least one of the first passage, second passage and the chamber,
   a resilient member acting on the closure member operable to prevent fluid communication between the first and second passages in a first position of the closure member abutting the elastomeric member when a pressure of the fluid of one of the first and second passages is generally equal to a fluid pressure of the other one of the first and second passages, the resilient member and the closure member operable, in a second position, to permit fluid flow between the first and second passages when the fluid pressure of one of the first and second passages are not equal to the fluid pressure of the other of the first and second passages, the flutes maintaining flow between the first and second passages when the closure member is in the second position.

2. The flow reversal control valve of claim 1, wherein the inner diameter of the second seal is greater than the inner diameter of the first seal.

3. The flow reversal control valve of claim 1, wherein the inner diameter of the second seal is smaller than the inner diameter of the first seal.

4. The flow reversal control valve of claim 1, wherein the elastomeric member comprises a annular elastomeric member having an inner diameter generally the same as an inner diameter of the seal and an outer diameter generally the same as an outer diameter of the seal.

5. The flow reversal control valve of claim 4, wherein the inner diameter of the second seal is smaller than the inner diameter of the first seal.

6. The flow reversal control valve of claim 1, wherein the first and second passages comprise respective serrated nozzles at distal ends along the longitudinal axis.

7. The flow reversal control valve of claim 1, wherein the resilient member comprises a coil spring having a first end abutting a boss portion of the chamber and a second end abutting the closure member.

8. The flow reversal control valve of claim 1, wherein the chamber comprises a first chamber having a first inner diameter and a second chamber having a second inner diameter greater than the first inner diameter.

9. The flow reversal control valve of claim 1, wherein the surface of the flutes are configured to maintain laminar flow between the first and second passages.

10. A flow reversal control valve for use in a fuel cell, the valve comprising
    a housing having a first end and a second end disposed along a longitudinal axis;
    a wall defining a first passage in fluid communication with a second passage, the first passage disposed proximate the first end, the second passage disposed proximate the second end;

a chamber coupled to one of the first and second passages, the chamber having flow flutes formed along the longitudinal axis in the chamber;

a seal disposed in the chamber and coupled to the at least one of the first and second passages, the seal including a first seal and a second seal, the second seal being substitutable in place of the first seal to adjust fluid flow between the first and second ends, the first seal having an inner diameter and an outer diameter, the second seal having an inner diameter and an outer diameter;

a closure member disposed in at least one of the first passage, second passage and the chamber;

an elastic member contiguous to the closure member, the closure member operable to prevent fluid communication between the first and second passages in a first position of the closure member abutting the seat face when a pressure of the fluid of one of the first and second passages is generally equal to a fluid pressure of the other one of the first and second passages, the closure member operable, in a second position, to permit fluid flow between the first and second passages when the fluid pressure of one of the first and second passages are not equal to the fluid pressure of the other of the first and second passages, the flutes centering the closure member on the seat face between the first and second passages when the closure member is in the second position.

11. The flow reversal control valve of claim 10, wherein the inner diameter of the second seal is greater than the inner diameter of the first seal.

12. The flow reversal control valve of claim 10, wherein the inner diameter of the second seal is smaller than the inner diameter of the first seal.

13. The flow reversal control valve of claim 10, wherein the seal has an elastomeric member comprising an annular elastomeric member having an inner diameter generally the same as an inner diameter of the seal and an outer diameter generally the same as an outer diameter of the seal.

14. The flow reversal control valve of claim 13, wherein the inner diameter of the second seal is greater than the inner diameter of the first seal.

15. The flow reversal control valve of claim 13, wherein the inner diameter of the second seal is smaller than the inner diameter of the first seal.

16. The flow reversal control valve of claim 10, wherein the first and second passages comprise respective serrated nozzles at distal ends along the longitudinal axis.

17. The flow reversal control valve of claim 10, wherein the resilient member comprises a coil spring having a first end abutting a boss portion of the chamber and a second end abutting the closure member.

18. The flow reversal control valve of claim 10, wherein the chamber comprises a first chamber having a first inner diameter and a second chamber having a second inner diameter greater than the first inner diameter.

* * * * *